United States Patent [19]

Vijay

[11] Patent Number: 4,529,024
[45] Date of Patent: Jul. 16, 1985

[54] TIRE CHANGER ACCESSORY FOR USE WITH CUSTOM ALLOY RIMS

[75] Inventor: Tumkur R. Vijay, Conway, Ark.

[73] Assignee: FMC Corporation, Chicago, Ill.

[21] Appl. No.: 566,834

[22] Filed: Dec. 29, 1983

[51] Int. Cl.³ .............................................. B60C 25/08
[52] U.S. Cl. ................................................. 157/1.24
[58] Field of Search ..................... 157/1.17, 1.22, 1.24

[56] References Cited

U.S. PATENT DOCUMENTS

| | | | |
|---|---|---|---|
| 2,569,788 | 10/1951 | Weaver | 157/1.24 |
| 2,661,793 | 12/1953 | Rockwell | 157/1.24 |
| 2,984,295 | 5/1961 | Riggs | 157/1.24 |
| 3,238,989 | 3/1966 | Silvestrani | 157/1.24 |
| 3,490,512 | 1/1970 | Ghyselinck | 157/1.24 |
| 4,210,190 | 7/1980 | Hessels | 157/1.24 |
| 4,230,170 | 10/1980 | Duquesne | 157/1.24 |

Primary Examiner—James G. Smith
Attorney, Agent, or Firm—H. M. Stanley; R. B. Megley

[57] ABSTRACT

An accessory tool for use on a tire changing machine when operating on custom alloy wheels is disclosed which clamps onto the tongue portion of the usual tire changer rotatably driven center post which is normally used to rotationally drive a slotted tire tool. The accessory tool has the capability of positioning a tire mount-/demount head radially and axially relative to the wheel rim and of securely clamping the mount/demount head in such selected position. Moreover, the clamping action for positioning the mount/demount head automatically lifts the head away from the rim surface to assure no contact between the head and the edge of the wheel rim when the accessory tool is rotated by rotation of the tire machine center post to mount or demount a tire bead over the edge of the rim.

22 Claims, 9 Drawing Figures

FIG_1

FIG_3

FIG_4

TIRE CHANGER ACCESSORY FOR USE WITH CUSTOM ALLOY RIMS

BACKGROUND OF THE INVENTION

1. Field of the Invention

This invention relates to an accessory for a tire changing machine, and more particularly to such an accessory for use when mounting or demounting tires on custom alloy wheel rims.

2. Description of the Prior Art

Tire changers such as the one disclosed in U.S. Pat. No. 4,335,772, Bubik et al, issued June 22, 1982 have a rotatably driven tire tool driving post with a flat tongue portion extending thereabove. After the bead of the tire has been broken from a wheel rim, a tire tool with a slot in the tool body is hooked under the tire bead and over the rim and the tool is then positioned so that the driving post tongue engages the slot in the tool. Actuation of the tire changer causes the tool to rotate around the rim, in scraping contact therewith, forcing the bead off of the rim in the rotation process. Similarly, when a bead is to be forced onto the rim, the tool has a combination configuration which forces the tire bead outwardly and downwardly behind the rim while the tool again slides in scraping contact with the rim as the driving post is actuated.

Sometimes nylon caps are placed on the aforementioned combination tool to prevent the metal-to-metal scraping or scrubbing during mounting and demounting of tires from rims. Alternatively the combination tool may be coated with some type of plastic in the area of rim contact. These solutions provide only limited satisfaction since the nylon caps tend to part from the tool and the plastic coatings tend to wear away quickly.

Certain types of tire changers use a turning table and a stationary mount/demount tool. While the stationary mount/demount head may avoid custom alloy rim damage, it requires a totally distinct machine from that normally used for mounting and dismounting tires on steel type automobile wheels which operate to break the tire beads from above and below while the wheel is stationary on the machine and thereafter mount or dismount the tire bead relative to the wheel rim with a tool rotated by the rotatably driven tire tool driving post.

SUMMARY OF THE INVENTION

This invention relates to an accessory for supporting a tire bead mount/dismount head for use on a tire changing machine operating to centrally receive a tire and wheel rim combination on a rotatably driven tire tool driving post having a tongue portion which extends therefrom. The tongue portion has a pair of opposing flat sides which are coterminous with a pair of opposing edges. A driving post clamp is adapted to securely engage the driving post tongue portion. A support clamp for the mount/demount head is provided wherein the support clamp is spaced from the driving post clamp and is adapted to support the mount/demount head in a position adjacent to but spaced from the edge of a wheel rim. A support bar assembly extends between and is coupled to each of the spaced driving post and support clamps, whereby driving the post with the driving post clamp mounted thereon causes the mount/demount head to travel along a path adjacent to and out of contact with the edge of the wheel rim.

DESCRIPTION OF THE PREFERRED EMBODIMENT

Figure 1:
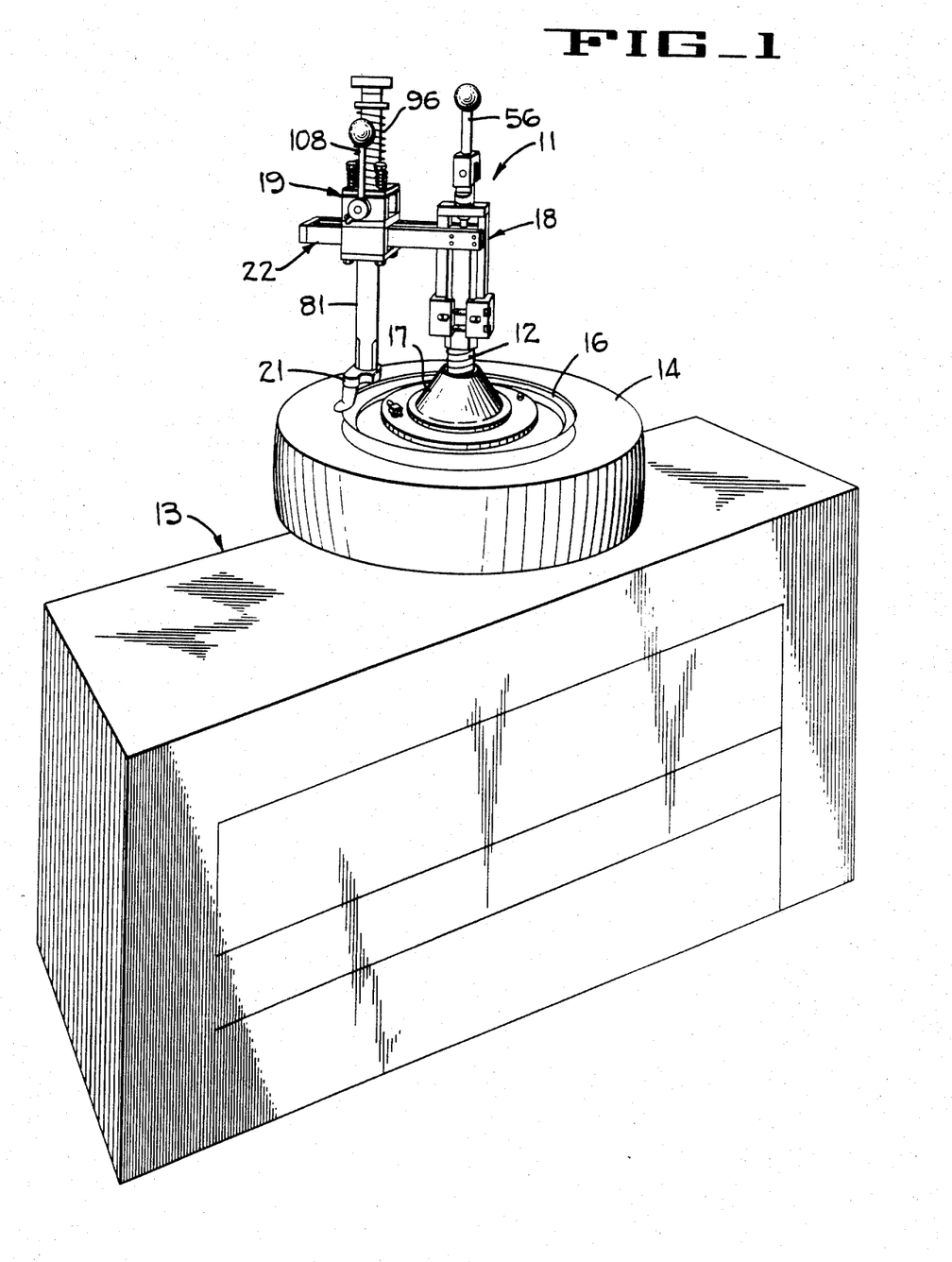
FIG. 1 a perspective view of the present invention mounted on a conventional United States type tire changing machine.

The accessory tool of the present invention is for use with a tire changing machine having a centrally located rotatably driven center post or shaft and enables mounting and demounting of tires on custom alloy wheel rims without allowing the mount/demount head to come into contact with the rims. The accessory tool is shown generally at 11 in FIG. 1 mounted on the centrally disposed rotatably driven center post 12 which extends upwardly from a tire changing machine 13. The tire changing machine is one which is well known in this art such as the machine disclosed in U.S. Pat. No. 4,335,772, Bubik et al, issued June 22, 1982. FIG. 1 further shows a combination of a tire 14 and a wheel rim 16 which is mounted over the driven center post and secured on the machine 13 by means of a cone shaped collar 17 together with associated components as described in either of U.S. Pat. Nos. 4,299,265, Alm, issued Nov. 10, 1981 and 4,304,285, Alm et al, issued Dec. 8, 1981.

FIG. 1 displays the accessory tool 11. A driving post clamp portion 18 is positioned atop the center post 12 and is attached thereto in a manner to be hereinafter described. A support clamp assembly 19 for a tire mount/demount head 21 is spaced from the driving post clamp. A support bar assembly 22 extends between the driving post clamp and the support clamp assembly and serves to couple the last two mentioned portions of the tool together so that the spacing therebetween may be adjusted and fixed for a specific tire 14 and rim 16 assembly. The type of rim 16 of primary interest for use with the disclosed accessory tool is generally a custom alloy rim which may be made of aluminum or magnesium and may be somewhat decorative. The material in this type of rim is generally brittle and is subject to damage if handled with the usual tire changing tools utilized for most tougher steel type wheel rims.

Figure 2:
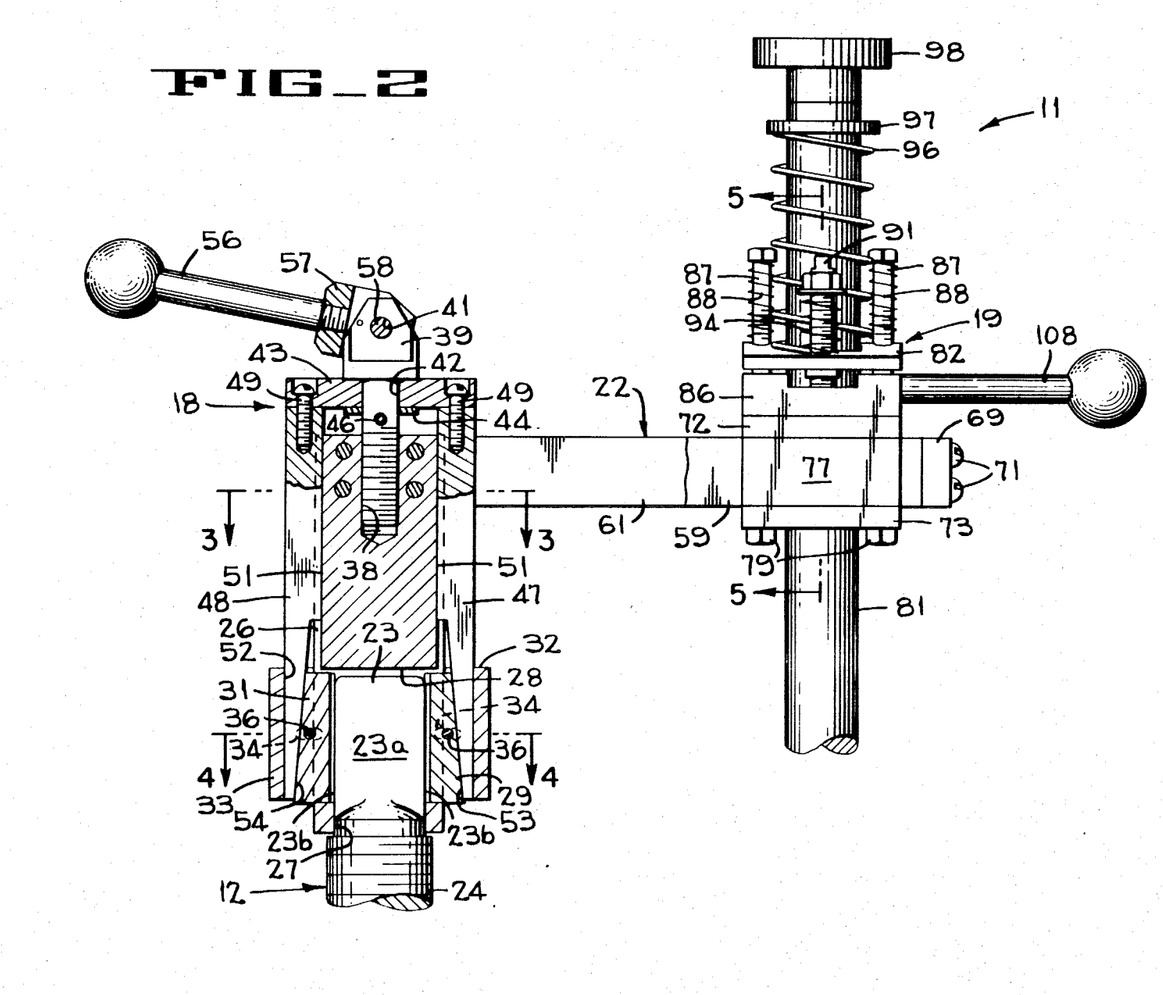
FIG. 2 is a side elevation of the present invention partially in section.

To provide the accessory tool necessary for use on the type of tire changing machine shown at 13 in FIG. 1, this invention provides the capability for clamping the tool onto the center post 12, for moving the tire mount/demount head 21 vertically and radially as seen in FIG. 1, and for further providing automatic separation of the mount/demount head from the surface of the rim 16 after the mount/demount head has been properly positioned to either place a tire bead over the edge of the rim or strip the tire bead therefrom. FIG. 2 is used to show the manner in which the accessory tool is fastened to the rotatably driven center post 12 on the tire machine 13. The center post has an upwardly extending tongue 23 which has two relatively broad opposing sides 23a and two other opposing relatively narrow edges 23b. The tongue is positioned above a number of coarse threads 24 on the center post. The threads receive the collar 17 (FIG. 1) which operates to secure the rim and tire assembly on the tire changing machine in the fashion hereinbefore described.

Figure 4:
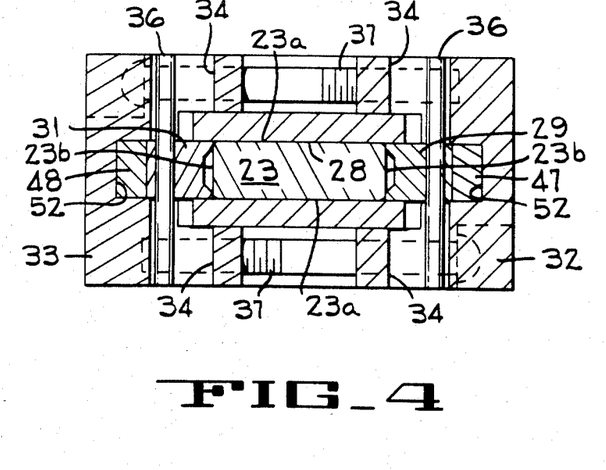
FIG. 4 is a horizontal section taken along the line 4—4 of FIG. 2.

The drive post clamp 18 is shown in the sectional portion of the side elevation view in FIG. 2. A post clamp body 26 has a passage 27 in the lower end thereof which is formed to receive the tongue 23 on the center post. The lower end of the post clamp body also has another passage 28 therethrough which is substantially perpendicular to and intersects the passage 27. A pair of wedges 29 and 31 are disposed within the passage 28 as depicted in the sectional views in both FIGS. 2 and 4. A pair of wedge guides 32 and 33 are formed somewhat U-shaped as seen in the sectional view of FIG. 4. Each of the wedge guides has a pair of aligned elongate holes 34 through the arms of the U. With the wedges disposed within their respective wedge guides, a pin 36 is pressed through the holes in the wedge arms so that the ends of the pin extend from each side of each wedge into the elongate holes 34. In this fashion the wedges may move in the direction of the long dimension of the holes 34 while being retained within the wedge guides by the pins 36. Thus, the wedges 29 and 31 may move within their respective wedge guides 32 and 33 so that they may alternatively be placed firmly in engagement with the edges 23b of the tongue 23 or loosely engaged therewith. The wedge guides 32 and 33 are secured together and held in place at the lower end of the post clamp body 26 by bolts 37 on each side thereof which extend through one of the wedge guides and are engaged by threads in the opposing guide as best seen in FIG. 4.

A threaded blind hole 38 is formed through the upper surface of the post clamp body 26. An actuator stud 39 is formed with a threaded shank thereon mating with the threads in the hole 38 and having an upper cap with a hole 41 therethrough. The actuator stud is disposed through a clearance hole 42 in an actuator plate 43 and is trapped in position on the actuator plate as shown in FIG. 2 by a washer 44 held in place by a pin 46 extending underneath the washer and through the shank of the actuator stud. The actuator stud is therefore free to be turned rotationally in the hole 42 in the actuator plate, but may not be moved axially relative to the actuator plate. A pair of wedge bars 47 and 48 are fastened to the opposing ends of the actuator plate by means of screws 49 as shown in FIG. 2. The wedge bars are disposed in grooves 51 running along the length of the post clamp body 26 on either side thereof. The wedge bars have distal ends which extend through grooves 52 formed in the wedge guides 32 and 33 (FIGS. 2 and 4). The wedge bars 47 and 48 have inside surfaces 53 and 54 near the distal ends thereof which are sloped and function as camming surfaces as best seen in FIG. 2. These camming surfaces may be seen to engage the outside surfaces of the wedges 29 and 31.

A handle or post clamp lever 56 has a pivot block 57 secured to one end thereof. The pivot block is a fork shaped piece with aligned holes substantially the same size as the hole 41 in the actuator stud through each arm of the fork. A pin 58 is driven through the aligned holes and the hole 41 in the actuator stud so that the lever 56 may be pivoted about the axis of the pin. The lever 56 may be disposed between an actuating position, as shown in FIG. 2, and an out-of-the-way or stowed position aligned with the axis of the actuator stud 39. When the lever 56 is turned in a clockwise direction looking from the top in FIG. 2, the actuator stud 39 advances in the threaded hole 38 thereby driving the wedge bars 47 and 48 downwardly in the view of FIG. 2. The camming surfaces 53 and 54 bear against the wedges 29 and 31 respectively, thereby forcing the wedges inwardly so that they firmly engage the edges 23b of the tongue 23 on the center post 12. The driving post clamp is thereby securely fixed to the rotatably driven center post. In like fashion, rotation of the lever 56 in a counterclockwise direction looking from the top retracts the driving stud 39 from the threaded hole 38 and withdraws the wedge bars 47 and 48 from the outside surfaces of the wedges 29 and 31. The wedge bars are therefore loosely engaged with the wedges and the driving post clamp may thereafter be lifted from the tongue 23.

Figure 3:
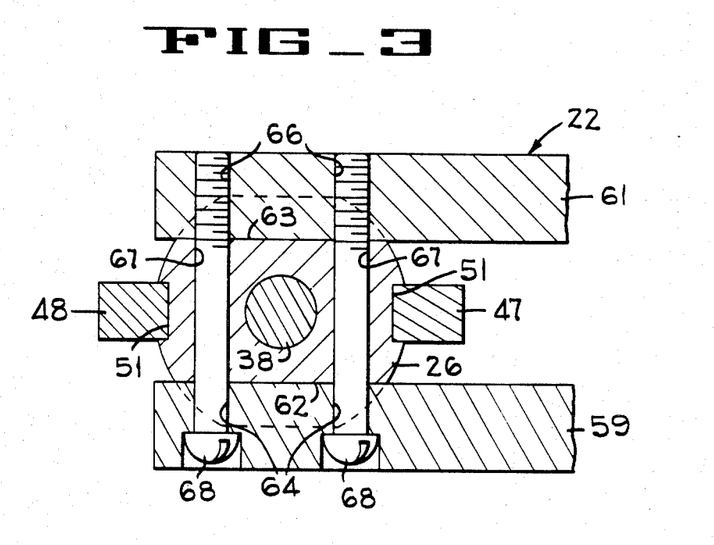
FIG. 3 is a horizontal section taken along the line 3—3 of FIG. 2.

The support bar assembly 22 has a back support bar 59 and a front support bar 61 which are positioned against two flats 62 and 63 respectively at the upper end of the post clamp body 26 as best seen in FIG. 3. Four clearance holes 64 are formed near one end of the back support bar 59 and four threaded holes 66, in the same pattern, are formed near one end of the front support bar 61. Four more clearance holes 67 having still the same pattern are formed near the upper end of the post clamp body 26. Four bolts 68 are passed through the clearance holes 64 and 67 so that they engage the threaded holes 66 and thereby secure the front and back bars 61 and 59 respectively to the upper end of the post clamp body 26. Consequently, the support bar assembly 22 extends substantially horizontally in one direction from the driving post clamp 18. The free end of the bars are secured in the same spaced relationship seen in FIG. 3 by a bracing bar 69 which may be seen attached thereto by screws 71 in FIG. 2.

Figure 5A:
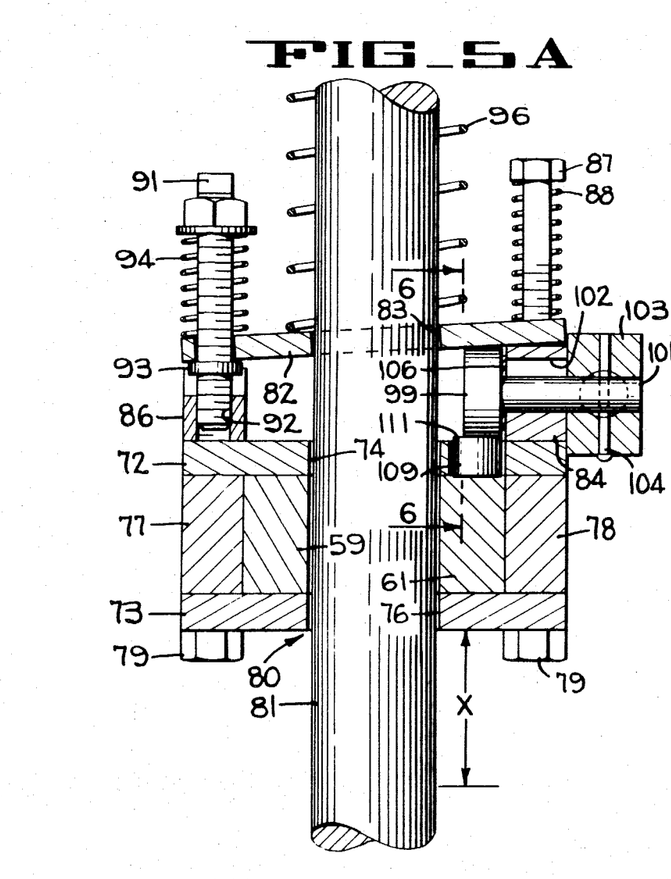
FIG. 5A is a vertical section taken along the line 5—5 of FIG. 2.
Figure 5B:
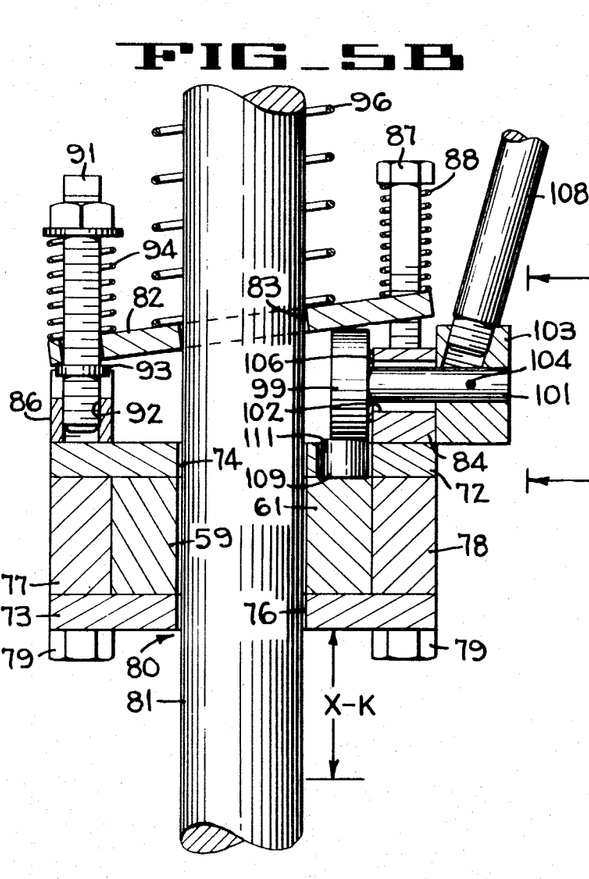
FIG. 5B is another vertical section taken along the line 5—5 of FIG. 2.

With reference to FIGS. 5A and 5B, the structure of the support clamp assembly for the mount/demount head will be undertaken. An upper guide plate 72 and a lower guide plate 73 have openings 74 and 76 therethrough which are in alignment when the guide plates are fixed together by means of spacer blocks 77 and 78 and bolts 79. The guide plates 72 and 73 may be seen to be positioned above and below the two front and back support bars 61 and 59 respectively and the openings 74 and 76 are thereby aligned with the space between the support bars. A mount/demount head mounting column 81 is disposed through these aligned openings and between the support bars and may therefore be moved in a substantially vertical direction as depicted by the drawing figures. The guide plates and the mount/demount head mounting column provide a support guide assembly 80 for the mount/demount head which may be seen to be spaced substantially horizontally along the support arm assembly from the driving post clamp assembly 18.

The aforementioned support guide assembly 80 including the guide plates 72 and 73 and the mounting column 81 are movable as a unit along the length of the support bars 59 and 61 comprising the support bar assembly 22. The mounting column 81 being movable vertically relative to the guide plates and the mount- /demount head 21 (FIG. 1) being mounted at the lower end of the column 81, the head 21 may thereby be positioned radially with respect to the combination of the tire 14 and wheel rim 16 as well as axially with respect thereto (horizontally and vertically in the Figures).

A clamping means is provided for the column 81 to hold the column and therefore the mount/demount head 21 in a desired axial position relative to the edge of the wheel rim 16. A latch plate 82 (FIGS. 5A and 5B) has an opening 83 formed therein having one dimension thereof slightly larger than the cross section dimension of the column 81. The latch plate is mounted on top of a cam support block 84 secured at one edge of the upper guide plate 72 and on top of a latch support block 86 attached to the upper surface of the opposite edge of the upper guide plate. The cam support block may be seen to have a larger height dimension in FIGS. 5A and 5B than the latch support block. Therefore, the latch plate, when positioned as shown with the opening 83 substantially in alignment with the openings 74 and 76 of the guide plates, is in a somewhat canted or inclined attitude with respect to the guide plates and the long axis of the mounting column 81. The bolts 79 have sufficient length to pass through clearance holes in the two guide plates and the spacer blocks 77 and 78 to engage threaded holes (not shown) in the cam and latch support blocks.

The latch plate 82 is maintained in position so that the opening 83 is in alignment with the openings 74 and 76 by means of two bolts 87 which pass through spaced clearance holes (not shown) adjacent one edge of the latch plate. The latch plate is disposed to move up and down on the bolts 87 against the force of compression springs 88 which are trapped between the latch plates and the heads of the bolts 87. The opposite edge of the latch plate 82 has a clearance hole 89 therethrough for receiving the threaded shank of a latch plate adjusting stud 91. The adjusting stud threadably engages a threaded hole 92 in the latch support block 86 and has a collar 93 fixed on the stud in a position below and supporting the opposite edge of the latch plate. Another compression spring 94 is positioned surrounding the latch plate adjusting stud and is trapped between the upper surface of the latch plate and the head of the stud. The lower end of the latch plate 82 may therefore be raised or lowered by adjusting the position of the stud in the threaded hole 92 for a purpose to be hereinafter described.

A larger compression spring 96 is positioned surrounding the mount/demount head mounting column 81. The lower end of the compression spring 96 bears against the upper surface of the latch plate 82 surrounding the opening 83. The spring 96 is captured on the column 81 by a collar 97 fixed atop the column by a knob 98 (FIG. 2) which has a threaded shank (not shown) engaging threads in a blind threaded hole (not shown) in the upper end of the column 81. The spring 96 and the collar 97 prevent the column 81 from falling out of the support guide assembly when the column is not latched vertically in place. It also tends to move the mount/demount head 21 away from the rim 16 when the support clamp 19 is released.

As may be seen in FIGS. 5A and 5B, an oval shaped cam 99 has a cam shaft 101 extending therefrom which passes through an elongate hole 102 in the cam support block 84. The hole 102 has a dimension in a horizontal direction in the Figures of 5A and 5B which merely affords clearance for the shaft 101, but which allows the shaft 101 to move in a vertical direction relative to the cam support block. The hole 102 may be seen in hidden lines in FIGS. 6A and 6B. Further, the oval shape of the cam 99 is readily discernible in the sectional views of 6A and 6B.

The cam shaft 101 after being passed through the elongate hole 102 has a cam collar 103 pinned thereto by means of a pin 104 which passes through mating holes in the shaft and the collar (FIG. 5A). An appropriate spacer 106 is disposed between the cam 99 and the inside surface of the cam support block 84 to prevent axial movement of the cam and the shaft and to provide relatively friction free rotation of the cam relative to the cam support block. The cam collar has a large threaded hole 107 through the periphery thereof which accepts the threaded end of a cam actuating lever 108.

The upper surface of the cam 99 may be seen to be adjacent to the lower surface of the latch plate 82. The lower surface of the cam 99 is adjacent to the upper surface of a pad 109 which is loosely fit in a hole 111 through the upper guide plate 72. The bottom surface of the pad 109 rests on the top surface of the front support bar 61 as seen in FIGS. 5A and 5B.

Initially a latch plate inclination adjustment is made by turning the latch plate adjust stud 91 into or out of the threaded hole 92 so that the lower end of the latch plate 82 is brought to a level such that the inclination of the latch plate allows the mount/demount head mounting column 81 to slide freely in a vertical direction through the opening 83 in the latch plate. This adjustment should be made so that when the cam 99 is in the position shown in FIG. 5A the column 8o is free to move through the opening 83 and when it is in the position shown in FIG. 5B the column is tightly locked in vertical position by engagement of the edges of the opening 83 with the outer surface of the column 81. The compression springs 88 and 94 keep the latch plate 82 in contact with the collar 93 on the adjusting stud at one edge and in contact with the surface of the cam 99 or the top edge of the cam support block 84 at the opposite edge, depending on whether the latching mechanism is engaged or disengaged respectively.

Figure 6A:
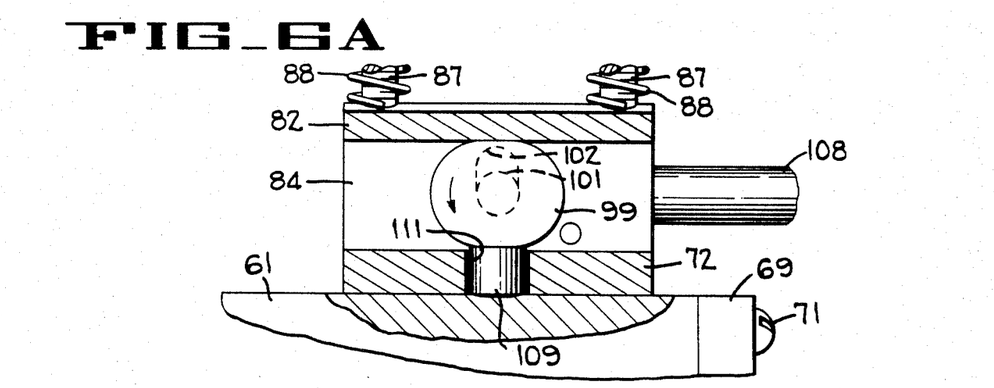
FIG. 6A is a vertical section taken along the line 6—6 of FIG. 5A.
Figure 6B:
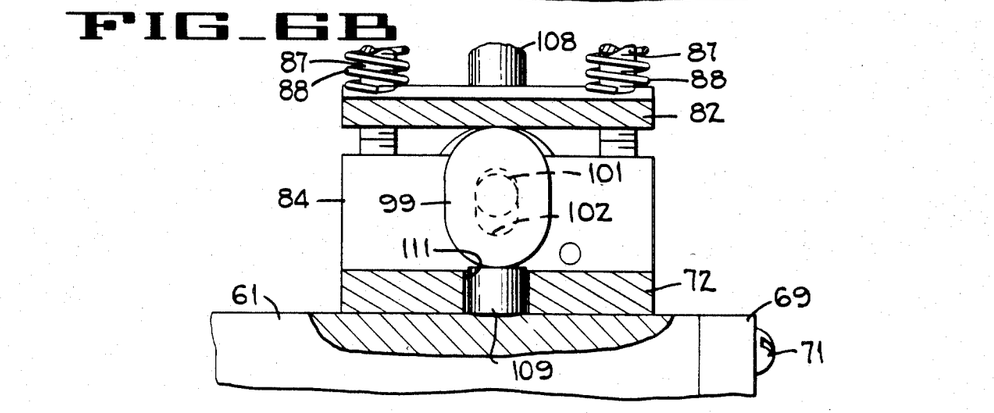
FIG. 6B is another vertical section taken along the line 6—6 of FIG. 5A.

Once the latch for the column 81 is properly adjusted as hereinbefore descrioed, reference to FIGS. 6A and 6B will reveal the manner in which column 81 is fixed in a desired vertical position and the support guide assembly 80 including the upper and lower guide plates 72 and 73 and the column 81 is fixed horizontally along the length of the support bar assembly 22. FIG. 6A shows the cam lever 108 disposed substantially horizontally with the small dimension of the cam 99 extending upwardly from the top of the pad 109 to a point below or adjacent to the undersurface of the latch plate 82. In this configuration the inclination of the latch plate relative to the longitudinal axis of the column 81 is such that the outer surface of the column clears the edges of the opening 83 in the latch plate. Further, the forces exerted by the compression springs 88 and 96 are supported by the upper surface of the cam support block 84. Therefore, there is minimal force (weight of the cam) exerted by the cam against the upper surface of the pad 109. There is therefore minimal force between the mating surfaces at the lower end of the pad 109 and the upper surface of the front support bar 61. The support guide assembly may therefore be freely moved horizontally on the support bar assembly 22 and the column 81 may be freely moved vertically in the support clamp assembly 19 to thereby position the tire mount/demount head 21 situated at the lower end of the column 81 in position to either mount a tire bead over the edge of the rim 16 or to demount the bead from the edge of the rim 16, whichever is desired. In this fashion the tire mount-/demount head 21 is positioned adjacent to the edge of the rim 16 before the cam actuation lever 108 is moved into the vertical position as seen in FIGS. 5B and 6B.

Upon actuation of the cam lever 108 to the position shown in FIGS. 5B and 6B, the cam 99 is disposed with the long axis of the oval oriented between the undersurface of the latch plate 82 and the upper surface of the pad 109. Therefore, the forces exerted by the compression spring 96 and the compression springs 88 are transmitted through the latch plate to the cam and then through the pad 109 to the upper surface of the front support bar 61. The support guide assembly 80 including the upper and lower guide plates 72 and 73 is therefore fixed along the length of the support bar assembly 22 in the desired radial position relative to the rim 16. Simultaneously, the inclination of the latch plate 82 is increased so that the edges of the opening 83 "bite" into the outer surface of the column 81 serving to lift the column upwardly from 0.1 to 0.2 inches, in this preferred embodiment, and to tightly lock the column in such vertical position. Therefore, the tire mount-/demount head 21 is lifted about 0.1 to 0.2 inches above the position to which it was manually adjusted adjacent the wheel rim 16. This feature is illustrated by the symbol X in FIG. 5A and the symbol X-K in FIG. 5B which show that the column 81 is lifted by the clamping mechanism. Positive clearance is therefore automatically provided between the mount/demount head 21 and the edge of the wheel rim 16 so that when the rotatably driven center post 12 is actuated on the tire changing machine 13, the mount/demount head 21 will follow a path close to the edge of the rim 16 but spaced therefrom.

Figure 7:
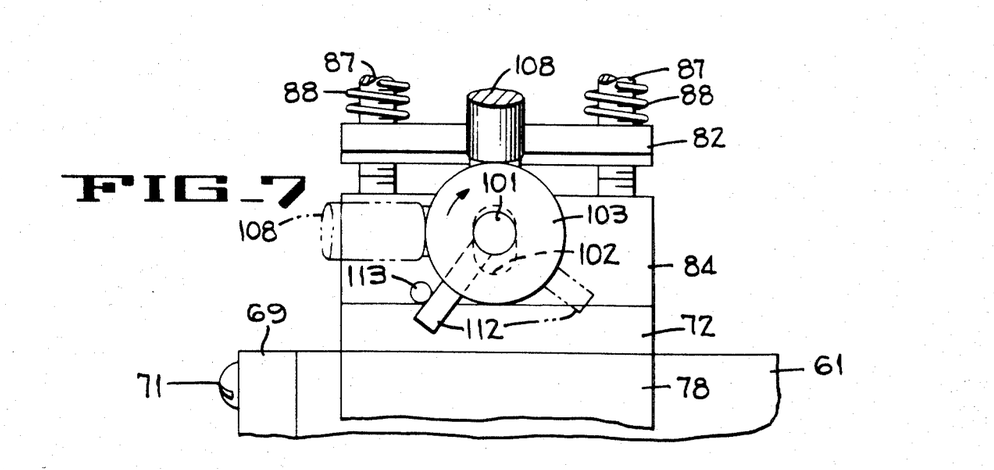
FIG. 7 is a partial view taken in the direction of arrows 7—7 of FIG. 5B.

It should be noted with reference to FIG. 7 that a pin 112 projects radially from the cam collar 103. Another pin 113 is fixed in and projects outwardly from the cam support block 84 in position to contact the pin 112 when the cam actuation lever 108 is positioned to place the cam 99 in the latching or clamping position for both the support guide assembly 80 and the column 81 as shown in FIG. 6B. In this fashion there is no necessity for an operator to search for the lever position where the highest point of the cam 99 extends between the pad 109 and the bottom surface of the clamping plate 82.

FIG. 1 shows the accessory tool of the present invention with the support clamp assembly 19 clamped in place on the support bar assembly 22 and the tire mount/demount head 21 properly spaced from the edge of the custom alloy rim 16 so that it cannot contact and damage the edge of the rim. Further, the post clamp lever 56, after being actuated as hereinbefore described, is shown in a raised out-of-the-way (stowed) position where it is held by a commonly known ball detent arrangement between the head of the actuator stud and the fork shaped piece 57 on the end of the post clamp turning lever.

Although the best mode contemplated for carrying out the present invention has been herein shown and described, it will be apparent that modification and variation may be made without departing from what is regarded to be the subject matter of the invention.

What is claimed is:

1. An accessory for supporting a tire bead mount-/demount head for use on a tire changing machine operating to centrally receive a tire and wheel rim combination on a rotatably drivine tire tool driving post having a tongue portion extending therefrom with a pair of opposing flat sides coterminous with a pair of opposing edges, comprising
   a driving post clamp body adapted to securely engage the driving post tongue portion,
   wedge means disposed within said clamp body adapted to engage at least one of the opposing edges of the driving post tongue,
   a support clamp for the mount/demount head, said support clamp being spaced from said driving post clamp body and being adapted to support the mount/demount head in a position adjacent to but spaced from the edge of a wheel rim, and
   a support bar assembly extending between and coupled to each of said spaced driving post and support clamps, whereby driving the post with the driving post clamp body mounted thereon causes the mount/demount head to travel along a path adjacent to and out of contact with the edge of the wheel rim.

2. An accessory as in claim 1 wherein said wedge means comprises
   at least one wedge,
   means disposed in said clamp body porviding limited movement of said wedge toward and away from engagement with the at least one tongue edge, and
   adjustable means for moving said wedge into and out of engagement with the tongue edge.

3. An accessory as in claim 2 wherein said adjustable means comprises
   a lead screw, and
   a wedge bar coupled to said lead screw and moving translationally therewith, said wedge bar having a cam surface thereon contacting said wedge so that translational movement of said wedge bar causes limited wedge movement in said means for mounting.

4. An accessory as in claim 1 wherein said support clamp comprises
   means for adjusting and fixing the spacing between said driving post and support clamps and the position of the mount/demount head adjacent to the edge of the wheel rim.

5. An accessory as in claim 1 wherein said support clamp comprises
   a mount/demount head mounting column,
   a guide plate surrounding said head mounting column fixedly disposed in a first plane substantially perpendicular thereto,
   a latch plate surrounding said head mounting column movably disposed in a second plane slightly inclined thereto, and
   means for varying the inclination of said second plane, whereby said latch plate contacts said mounting column on opposing sides thereof when inclination is increased, thereby fixing said column relative to said latch plate.

6. An accessory as in claim 5 wherein said means for varying the inclination comprises a cam selectively positioned to bear against one side of said latch plate so that said column is fixed relative to said latch plate.

7. An accessory as in claim 6 wherein said support clamp is mounted for movement along the length of said support bar assembly, and comprises
   means for contacting said support bar assembly positioned adjacent to said cam, so that when said cam is positioned to bear against said latch plate said last named means is forced against said support bar assembly, whereby said mount/demount head position is fixed relative to said drive post clamp body.

8. An accessory as in claim 4 wherein said support bar assembly is fixed at one end to said driving post clamp, body said support clamp including a vertically movable mount/demount head mounting column, and wherein said means for adjusting and fixing comprises means for simultaneously locking said support clamp and said head mounting column in position on said support bar assembly and said support clamp respectively.

9. An accessory carrying a tire bead mount/demount head for use on a tire changing machine operating to centrally receive a tire and wheel rim combination on a rotatably driven tire tool driving post having a tongue portion extending upwardly therefrom with a pair of opposing flat sides coterminous with a pair of opposing edges, comprising a driving post clamp body configured to receive and to securely engage the driving post tongue portion, wedge means adapted to engage at least one edge of the tongue portion and mounted within said clamp body for inward and outward movement relative thereto, a support guide assembly for the mount/demount head spaced substantially horizontally from said driving post clamp body and adapted to receive and support the mount/demount head, a support bar assembly extending between and coupled to said spaced driving post clamp body and head support guide, and clamping means for fixing the horizontal spacing between said driving post clamp body and said head support guide assembly and the vertical position of the mount/demount head so that it is adjacent to the wheel rim edge.

10. An accessory as in claim 9 wherein said wedge means comprises at least one wedge, means for limiting the inward and outward movement of said wedge, and means for urging said wedge to undergo said inward and outward movement, whereby said wedge is moved into and out of engagement with the edge of the tongue portion.

11. An accessory as in claim 9 wherein said support guide assembly comprises upper and lower guide plates having aligned apertures therein, an elongate mount/demount head mounting column slidably disposed through and guided by the edges of said aligned apertures, and means for securing said guide plates in spaced relation on opposing sides of said support bar assembly, whereby said support guide assembly is movable on said support bar assembly toward and away from said driving post clamp body.

12. An accessory as in claim 11 wherein said clamping means comprises a latch plate having an opening therethrough for receiving said elongate mounting column, said opening being only slightly larger in one dimension than the corresponding mounting column dimension, and means for selectively imparting a couple to said latch plate to thereby bring the edges of said opening at opposing ends of said one dimension into binding contact with the surface of said mounting column.

13. An accessory as in claim 11 wherein said clamping means comprises a cam actuable between a position imposing a braking force between said support guide assembly and said support bar assembly and a position relieving said braking force, whereby said assemblies are alternatively fixed together and movable one relative to the other.

14. An accessory as in claim 12 wherein said means for selectively imparting a couple comprises a cam actuable between a lock position urging said latch plate into said binding contact with said mounting column and an unlock position relieving said binding contact, said cam further comprising means for imparting a braking force between said support guide and said support bar assemblies when in said lock position.

15. An accessory as in claim 9 wherein said support bar assembly comprises an elongate bar assembly fixed at one end to said driving post clamp body, and wherein said support guide assembly comprises means surrounding said bar assembly configured for sliding motion therealong, and an elongate mount/demount head mounting column mounted for translational movement relative to said means surrounding said bar assembly, and wherein said clamping means comprises a locking cam operating to simultaneously fix said support guide assembly on said bar assembly and said head mounting column in said support guide assembly when in a cam lock position.

16. An accessory carrying a tire bead mount/demount head for use on a tire changing machine operating to centrally receive a tire and wheel rim combination on a rotatably driven tire tool driving post having a tongue portion extending upwardly therefrom with a pair of opposing flat sides coterminous with a pair of opposing edges, comprising a driving post clamp including a body having an opening therein adapted for overlying engagement with the driving post tongue portion, wedge means mounted in said clamp body for inward and outward movement relative thereto and adapted to engage at least one edge of the post tongue portion, means for adjusting said wedge means between a tightly engaged condition with the tongue portion and a loose disengaged condition therewith, a support guide assembly for the tire bead mount/demount head spaced substantially horizontally from said driving post clamp and adapted to receive the mount/demount head at the lower end thereof, a support bar assembly extending between and coupled to said spaced driving post clamp and mount/demount head support guide, means for setting and fixing the horizontal spacing between said driving post and mount/demount head support guide assembly, and means for setting and fixing the vertical position of the mount/demount head so that it is adjacent the edge of the wheel rim and the bead of the tire.

17. An accessory as in claim 16 wherein said means for adjusting comprises a wedge bar having a cam surface thereon, and means for driving said wedge bar translationally so that said cam surface moves said wedge means through said inward and outward movement, whereby said tightly engaged and loose disengaged conditions respectively are obtained.

18. An accessory as in claim 16 wherein said means for setting and fixing the horizontal spacing and the vertical position include a common cam means, whereby cam means actuation fixes both horizontal spacing and vertical position of the mount/demount head.

19. An accessory carrying a tire bead mount/demount head for use on a tire changing machine operating to centrally receive a tire and wheel rim combination on a rotatably driven tire tool driving post having a tongue portion extending upwardly therefrom with a pair of opposing flat sides coterminous with a pair of opposing edges, comprising
 a driving post clamp adapted for overlying engagement with the driving post tongue portion,
 means for adjusting said driving post clamp between a tightly engaged condition with the tongue portion and a loose disengaged condition therewith,
 a support guide assembly for the tire bead mount/demount head spaced substantially horizontally from said driving post clamp and adapted to receive the mount/demount head at the lower end thereof, said support guide assembly comprising upper and lower guide plates having aligned apertures therein, and an elongate mount/demount head mounting column slidably disposed through and guided by the edges of said aligned apertures, said mounting column being adapted to carry the tire bead mount/demount head,
 a support bar assembly extending between and coupled to said spaced driving post clamp and mount/demount head support guide,
 said support bar assembly comprising spaced parallel front and back support bars fixed at one end to said driving post clamp, said upper and lower guide plates being disposed above and below said support bars respectively, and said head mounting column passing through the space between said support bars, whereby said guide plates are movable along said support bars and said head mounting column is movable relative to said guide plates,
 means for setting and fixing the horizontal spacing between said driving post and mount/demount head support guide assembly, and
 means for setting and fixing the vertical position of the mount/demount head so that it is adjacent the edge of the wheel rim and the bead of the tire.

20. An accessory as in claim 19 wherein said upper and lower guide plates are disposed above and below said support bar assembly respectively, whereby said guide plates are movable along said support bar assembly, and wherein said means for setting and fixing the horizontal spacing between said driving post and said support guide assembly comprises
 means for alternatively applying and relieving a substantially normal force between said support guide and support bar assemblies.

21. An accessory as in claim 19 wherein said means for setting and fixing the vertical position of the mount/demount head comprises
 a latch plate having an opening therethrough accepting said head mounting column, said opening being only slightly larger in one dimension than the corresponding head mounting column dimension,
 means for selectively imparting a couple to said latch plate so that the edges of said opening at opposing ends of said one dimension are brought into binding contact with said mounting column.

22. An accessory as in claim 20 wherein said means for applying comprises a brake pad disposed adjacent to said support bar assembly and means mounted on said support guide assembly for selective actuation between a lock position urging said brake pad against said support bar assembly and an unlock position removed therefrom.

* * * * *